United States Patent [19]

Hijikata et al.

[11] 3,971,898

[45] July 27, 1976

[54] VISUAL INDICATING CONTROL CIRCUIT IN KEY TELEPHONE SYSTEM

[75] Inventors: Tokuhisa Hijikata; Koichi Sekiguchi, both of Tokyo, Japan

[73] Assignee: Iwatsu Electric Co., Ltd., Tokyo, Japan

[22] Filed: Mar. 14, 1975

[21] Appl. No.: 558,476

[30] Foreign Application Priority Data
Apr. 9, 1974  Japan................................ 49-40335
Dec. 19, 1974  Japan............................. 49-146544

[52] U.S. Cl.................................. 179/99; 179/81 C
[51] Int. Cl.²......................................... H04M 1/22
[58] Field of Search.................. 179/84 L, 99, 81 C, 179/18 F, 18 FA; 307/311

[56] References Cited
UNITED STATES PATENTS

| | | | |
|---|---|---|---|
| 3,469,036 | 9/1969 | Meri................................. | 179/84 L |
| 3,566,044 | 2/1971 | Cross................................ | 179/99 |
| 3,567,868 | 3/1971 | Mukae et al...................... | 179/81 C |
| 3,819,871 | 6/1974 | Verdon.............................. | 179/99 |
| 3,842,216 | 10/1974 | Owen et al....................... | 179/84 L |
| 3,931,479 | 1/1976 | Warman et al................... | 179/99 |

FOREIGN PATENTS OR APPLICATIONS

| | | | |
|---|---|---|---|
| 884,832 | 12/1961 | United Kingdom............... | 179/18 F |

*Primary Examiner*—Kathleen H. Claffy
*Assistant Examiner*—Randall P. Myers
*Attorney, Agent, or Firm*—Oblon, Fisher, Spivak, McClelland & Maier

[57] ABSTRACT

A visual indicator control circuit for use in key telephone systems is disclosed. The circuit includes a plurality of light emitting diodes connected in series and operated by a plurality of transistors having collector-emitter paths connected in parallel with the light emitting diodes. Circuits are provided for controlling the respective base electrode voltages of the transistors corresponding to the use status of each line to control the light emitting diodes corresponding to the on or off states of the transistors.

8 Claims, 4 Drawing Figures

PRIOR ART FIG. 1
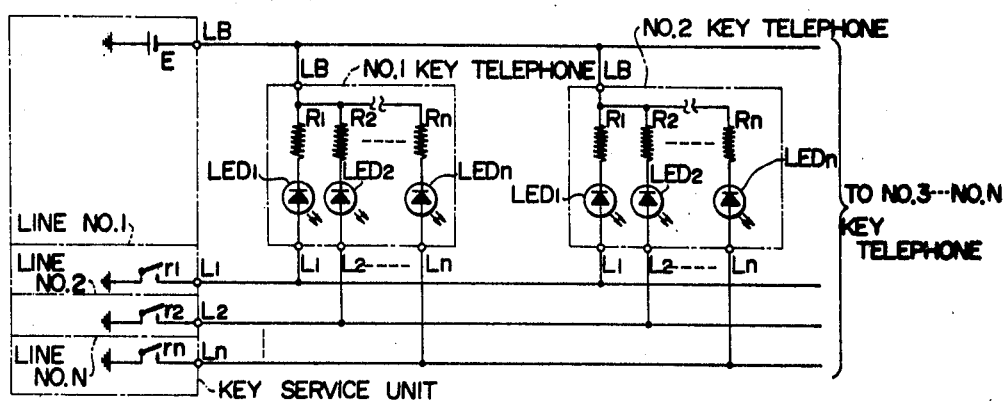
FIG. 2
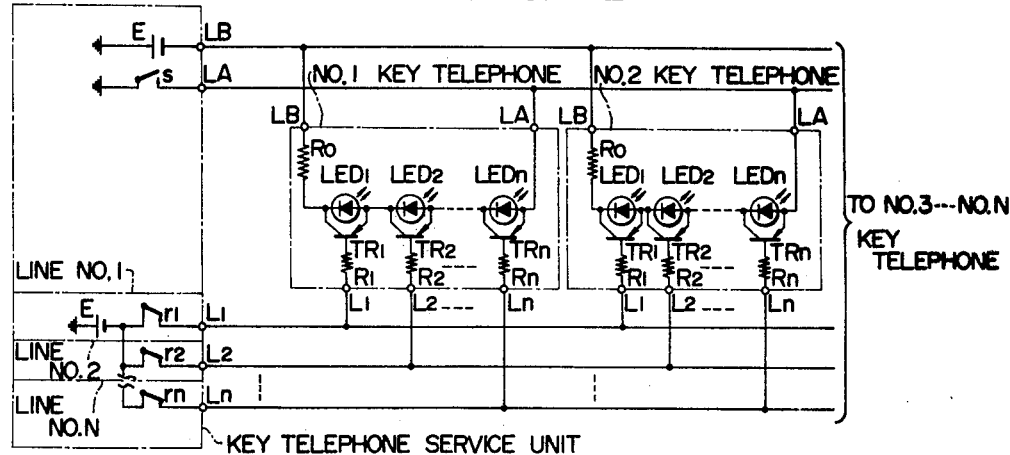

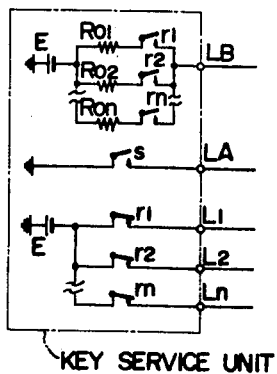
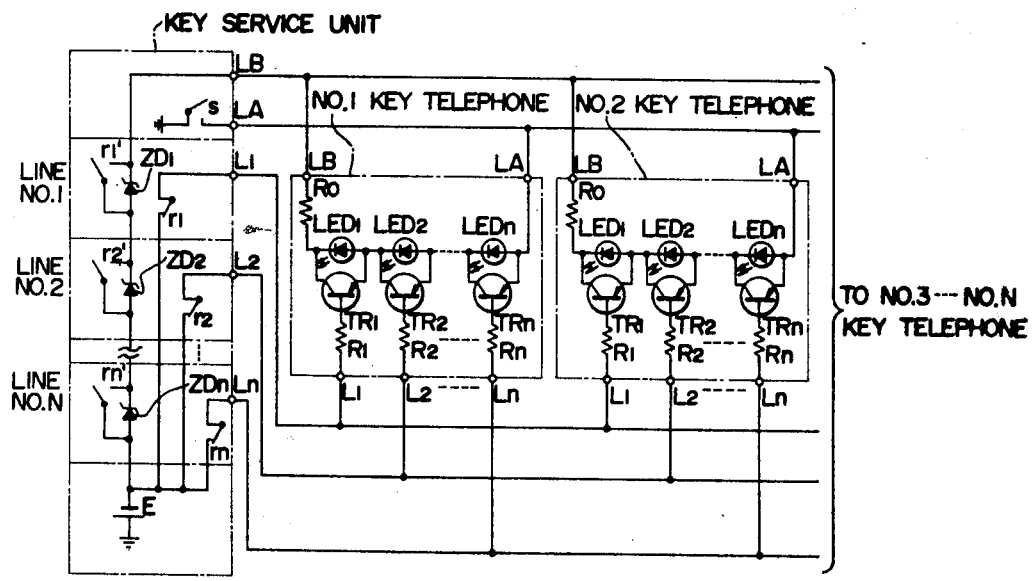

VISUAL INDICATING CONTROL CIRCUIT IN KEY TELEPHONE SYSTEM

BACKGROUND OF THE INVENTION

1. Field of the Invention:

This invention relates to a key telephone indicator control circuit and more particularly to a control circuit for visually indicating the use status of each line in a key telephone system.

2. Description of the Prior Art:

In conventional key telephone systems there are provided tungsten lamps, neon lamps or light emitting diodes as visual indicating elements in each key telephone set in order to indicate the use status of each line or each intercom. The tungsten lamps have the defect of short life, and the neon lamps have defect of generally requiring a high voltage power supply (more than 100 volts for example). Accordingly, long life and low voltage-operated light emitting diodes have recently been used in such indicating circuits.

An exemplary conventional indicating circuit for a key telephone system is shown in FIG. 1, where a contact $r1$ of a relay is closed by an incoming call signal establishing a circuit through control line L1, light emitting diode LED1, resistor R1 and control line LB to power source E. As a result, the light emitting diode LED1 of each telephone set emits light. When the contact $r1$ operates intermittently, the light emitting diode LED1 lights or is extinguished in accordance with the period of the intermittent action of the contact $r1$, and when the contact $r1$ operates continuously, the light emitting diode LED1 remains lighted. In both cases the use status of line No. 1 is indicated in each telephone set. The current required to operate the light emitting diode is about 10mA. The conventional circuit as shown in FIG. 1 permits current to flow through each light emitting diode Led1–LEDn separately, so that the total capacity of the power source in the key telephone system is the product of the number of lines plus the number of intercom stations and the number of telephone sets and the required current for one light emitting diode. Accordingly, such conventional key telephone systems providing a number of lines and telephone sets create problems with respect to cost and space. Most of the electric power supplied to these conventional key telephone systems is not consumed in the light emitting diodes themselves, but is wasted as joule heat in resistors R1–Rn coupled in series with light emitting diodes LED1–LEDn. As a result thereof electric power efficiency deteriorates on a large scale. Furthermore as large currents flow in control lines LB and L1–Ln, the voltage drop in the cable becomes large and performance of the cable deteriorates due to heat generated therein. Therefore in the prior art, a plurality of thick cables in parallel are required for the control lines respectively. Thus these prior art systems are undesirable and inefficient in view of increased size and high construction costs.

SUMMARY OF THE INVENTION

Accordingly one object of the present invention is to provide a control circuit for use in a key telephone system for visually indicating the use status of all lines in each telephone set at low cost and occupying a minimum space.

Another object of the present invention is to provide a visual indicator control circuit for a key telephone system in which light emitting diodes are illuminated substantially constantly independent of the number of lines in use.

Briefly, in accordance with the present invention, these and other objects are achieved by providing a visual indicator control circuit which includes a plurality of light emitting diodes in series operated respectively by the same current. A plurality of transistors are provided having collector-emitter paths in parallel with the light emitting diodes, as is a circuit for controlling the respective base electrode voltages of the transistors corresponding to the use status of each line, whereby the light emitting diodes are switched on and off corresponding to on and off states of the transistors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates in schematic form a conventional visual indicator control circuit for use in key telephone systems;

FIG. 2 illustrates in schematic form the visual indicator control circuit for use in key telephone systems of the present invention;

FIG. 3 illustrates in schematic form another embodiment of the visual indicator control circuit shown in FIG. 2; and FIG. 4 illustrates in schematic form still another embodiment of the visual indicator control circuit of the present invention.

DESCRIPTION OF THE PREFERRED EMBODIMENTS

Referring now to the drawings, wherein like reference numerals designate identical or corresponding parts throughout the several views, and more particularly to FIG. 2 thereof, E designates a power source within a key service unit, $s$ represents a contact to be operated when either line is carrying an incoming call, an outgoing call or a hold signal, $r1$–$rn$ are contacts of control relays corresponding to lines No. 1–No. N respectively, LA, LB and L1–Ln designate control lines extending between the key service unit and each key telephone set respectively. The reference characters LED1, LED2, –LEDn represent light emitting diodes for indicating the use status of each line and correspond to lines No. 1–No. N respecively, TR1–TRn are transistors which control the lighting and extinguishing of the light emitting diodes LED1–LEDn respectively, wherein the collector-emitter path of each of transistors TR1–TRn is connected in parallel with one of the light emitting diodes LED1–LEDn. When transistors TR1–TRn permit current to flow through the base electrodes thereof, transistors TR1–TRn assume on-state so that the corresponding light emitting diodes are short-circuited so as to emit no light. On the other hand, when current does not flow in the base electrodes of the transistors TR1–TRn, these transistors TR1–TRn assume the off-state so that the corresponding light emitting diodes are energized so as to emit light. $Ro$ is a resistor which limits current flowing through the light emitting diodes LED1–LEDn and R1–Rn are resistors which limit the current flowing through the base electrodes of transistors TR1–TRn respectively. The operation of the indicating control circuit of the present invention will now be explained in more detail with reference to FIG. 2.

When line No. 1 comes into use, contact s closes and contact r1 opens. Accordingly, control line LA is grounded through the contact s within the key service unit so that transistor TRn assumes an on-state by establishment of the following circuit, and light emitting diode LEDn is short-circuited. The circuit includes ground, contact s, control line LA, transistor TRn(E–B), resistor Rn, control line Ln, contact rn and battery E. When transistor TRn assumes an on-state, transistors TRn-1–TR2 assume an on-state in turn. As a result thereof, all light emitting diodes LEDn–LED2 are short-circuited so that they do not emit light. On the other hand, as transistor TR1 does not permit current to flow through the base electrode thereof due to the off-state of contact r1, transistor TR1 assumes the off-state so that the short-circuit of light emitting diode LED1 is removed and current flows only through LED1. The circuit includes ground, contact s, control line LA, transistor TRn(E–C), TR2(E–C), light emitting diode LED1, resistor Ro, control line LB and battery E. As a result, the in-use status of line No. 1 is indicated visually.

When contact r1 operates intermittently, when contact r1 closes, transistor TR1 assumes the on-state so that light emitting diode LED1 is short-circuited and extinguished. That is to say, the light emitting diodes light or are extinguished in synchronism with the on-off periods of the contacts r. Furthermore, when contact rn opens simultaneously with contact r1, transistor TRn assumes the off-state with transistor TR1 so that light emitting diode LEDn emits light simultaneously with light emitting diode LED1. Accordingly, when a single line is in use or when more than one line is in use simultaneously, lighting or extinguishing of the corresponding light emitting diodes may be controlled in accordance with operation of contacts r1–rn.

In above-described embodiment, PNP transistors are used for controlling the on-off switching of the light limiting diodes, but NPN transistors may of course be used. In this case on-off switching of the transistors is controlled by the effect of the ground.

A further improvement of the above-mentioned embodiment will now be described with reference to FIG. 3. In the circuit of FIG. 2, the terminal voltage across each of the light emitting diodes when the switching transistors are in their off-state (that is to say the respective lines are in use) is different from the terminal voltage when the transistors are in their on-states. Accordingly, when the number of lines in use at the same time changes, the current flowing through the light emitting diodes changes substantially depending upon the value of the battery voltage E or the resistor Ro. FIG. 3 shows another embodiment of the invention in which the circuit of FIG. 2 is improved in order to eliminate the above-mentioned problem. As is apparent from FIG. 3, contacts r1–rn of the control relay for each line and resistors Ro1–Ron for limiting current through the light emitting diodes are provided between battery E and control line LB.

Referring to FIG. 2 and FIG. 3, when line No. 1 is in use, contact r1 operates and current from resistor Ro1 flows through the light emitting diodes LED1 (shown in FIG. 2) of each key telephone set. Furthermore when line No. 2 is in use simultaneously with line No. 1, contact r2 operates and current flows through resistor Ro2 to light emitting diode LED2 as shown in FIG. 2. In the embodiment of FIG. 2, when light emitting diode LED1 is connected in series with light emitting diode LED2, the impedence becomes high so that current becomes small compared with the impedence when only light emitting diode LED1 assumes the on-state. In order to prevent this current decrease in the light emitting diodes, resistor Ro2 is connected in parallel with resistor Ro1 by closing contact r2. As a result thereof, provisional battery voltage is increased by the drop in voltage across resistor Ro when light emitting diodes LED1 and LED2 are switched on in series, so that current flowing in each light emitting diode is substantially constant and the brightness of each light emitting diode is thus kept constant.

In reference to FIG. 4, another embodiment of the present invention which includes further improvements of the FIG. 2 embodiment will now be described in detail. The reference characters ZD1–ZDn designate zener diodes corresponding to lines No. 1–No. N respectively and have a voltage drop substantially equal to the voltage drop of light emitting diodes LED1–LEDn. The reference characters r1'–rn' designate "make" contacts of control relays (not shown in FIG. 4) corresponding to lines No. 1–No. N respectively. When line No. 1 is in use, contact s closes and the control relay of line No. 1 is energized to open "break" contact r1 thereof so that transistor TR1 assumes the off-state. As a result, light emitting diode LED1 emits light. At the same time, "make" contact r1' closes and zener diode ZD1 is short-circuited, so that light emitting diode LED1 emits light by establishment of following circuit; ground, contact s, control line LA, transistors TRn(E–C)–TR2(E–C), light emitting diode LED1, resistor Ro, control line LB, contact r1', zener diodes ZD2–ZDn and battery E. Furthermore, when line No. 1 and line No. N are in use simultaneously, "break" contacts r 1, rn open and "make" contacts r1', rn' close, so that light emitting diodes LED1, LEDn emit light and zener diodes ZD1, ZDn are short-circuited. In this way, zener diodes ZD1–ZDn corresponding to light emitting diodes LED1–LEDn are short-circuited. When light emitting diodes are extinguished, the short-circuits thereof are released so that voltage between the terminals LA, LB is changed according to the on or off states of the light emitting diodes. That is to say, the voltage VAB between terminals LA, LB is as follows, wherein V designates the voltage of battery E and v is the voltage drop of one zener diode: When line No. 1 is in use, $$VAB^1 = V - (n-1)v \qquad (1)$$

when line No. 1 and line No. 2 are in use, $$VAB^2 = V - (n-2)v \qquad (2)$$

when all of lines No. 1–No. N are in use simultaneously, $$VAB^n = V \qquad (3)$$

Accordingly, if the voltage drop of the light emitting diodes LED1–LEDn is designated v, which is equal to the voltage drop of zener diodes ZD1–ZDn respectively current in the light emitting diodes LED1–LEDn in the above-mentioned equations (1), (2) and (3) respectively, is constant, as shown below:

$$I(LED1) = VAB^1 - v = V - nv \qquad (4)$$

$$I(LED2) = VAB^2 - 2v = V - nv \qquad (5)$$

$$I(LEDn) = VAB^n - nv = V - nv \qquad (6)$$

In the above described embodiment of FIG. 4, zener diodes are used as constant voltage elements, but diodes and the like other than zener diodes may also be used. According to the embodiment of the present invention shown in FIG. 4, in spite of the number of lines in use, current flowing through the light emitting diodes LED1–LEDn is kept constant so that the brightness of the light emitting diodes is substantially constant. As a result thereof the indicating control circuit of the present invention is very useful in key telephone sets in which a plurality of light emitting diodes are utilized.

It can thus be seen that the objects of the invention have been accomplished. A visual indicator control circuit for key telephone systems including light emitting diodes in series, operated respectively by the same current has been disclosed.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A visual indicator control circuit for use in key telephone systems including a plurality of lines comprising:
    a direct current power supply,
    a plurality of light emitting diodes provided in a key telephone set coupled in series across said power supply,
    a plurality of transistors provided in the key telephone set having collector-emitter paths connected in parallel with said light emitting diodes,
    control circuit means provided in a key service unit coupled to the base electrodes of said transistors for selectively switching said transistors corresponding to the use status of each line to their non-conductive state whereby said light emitting diodes are selectively energized to indicate the use status of said lines.

2. A circuit as in claim 1, further comprising:
    current limiting means coupled to said light emitting diodes for maintaining the current through said light emitting diodes substantially constant independent of the number of said light emitting diodes which are energized.

3. A circuit as in claim 2,
    wherein said control circuit means comprise a plurality of switching means coupled to said lines and responsive to the use status thereof.

4. A circuit as in claim 2, wherein said current limiting means include a plurality of resistors coupled in series with said switching means and coupled in parallel with one another.

5. A circuit as in claim 1 further comprising:
    constant voltage means coupled to said power supply and to said light emitting diodes for limiting the voltage across said light emitting diodes; and,
    short circuiting means for selectively short circuiting said constant voltage means in response to the use status of said lines.

6. A circuit as in claim 5, wherein:
    said constant voltage means comprise zener diodes.

7. A circuit as in claim 4, wherein:
    said short circuiting means comprise contacts operated in response to the use status of said lines, said contacts coupled in parallel with said constant voltage means.

8. A circuit in claim 7, wherein:
    said constant voltage means comprise zener diodes.

* * * * *